(12) United States Patent
Roeben et al.

(10) Patent No.: US 11,008,441 B2
(45) Date of Patent: May 18, 2021

(54) SILANE MIXTURES AND PROCESSES FOR PREPARATION THEREOF

(71) Applicant: Evonik Operations GmbH, Essen (DE)

(72) Inventors: Caren Roeben, Essen (DE); Ralph Moser, Jersey City, NJ (US); Alexander Koepfer, Bernau im Schwarzwald (DE); Sebastian Rosenstingl, Loerrach (DE); Stefanie Mayer, Rheinfelden (DE); Andre Hasse, Juelich (DE); Frank Forster, Schoellkrippen (DE)

(73) Assignee: Evonik Operations GmbH, Essen (DE)

( * ) Notice: Subject to any disclaimer, the term of this patent is extended or adjusted under 35 U.S.C. 154(b) by 381 days.

(21) Appl. No.: 16/201,495

(22) Filed: Nov. 27, 2018

(65) Prior Publication Data

US 2019/0161600 A1    May 30, 2019

(30) Foreign Application Priority Data

Nov. 28, 2017 (DE) .......................... 102017221282.9

(51) Int. Cl.
*C08K 5/00* (2006.01)
*C08K 5/548* (2006.01)
*C07F 7/18* (2006.01)
*C08L 9/00* (2006.01)
*C08L 9/06* (2006.01)
*C08K 3/36* (2006.01)

(52) U.S. Cl.
CPC ............ *C08K 5/548* (2013.01); *C07F 7/1804* (2013.01); *C08K 3/36* (2013.01); *C08L 9/00* (2013.01); *C08L 9/06* (2013.01)

(58) Field of Classification Search
None
See application file for complete search history.

(56) References Cited

U.S. PATENT DOCUMENTS 6,114,560 A * 9/2000 Ichinohe ............... C07F 7/1804
556/427

FOREIGN PATENT DOCUMENTS

| DE | 29724802 U1 * | 11/2004 | ............ C07F 7/1804 |
| EP | 2 567 116 A1 | 2/2013 | |
| JP | 2012-111838 A | 6/2012 | |
| WO | WO-2013023978 A1 * | 2/2013 | ............ C07F 7/1804 |

OTHER PUBLICATIONS

DE-29724802-U1—English translation (Year: 2004).*
WO2013023978—English translation (Year: 2013).*
Extended European Search Report dated Apr. 30, 2019 in Patent Application No. 18206629.0.

* cited by examiner

*Primary Examiner* — Stefanie J Cohen
(74) *Attorney, Agent, or Firm* — Oblon, McClelland, Maier & Neustadt, L.L.P.

(57) ABSTRACT

The invention relates to silane mixtures comprising a silane of the formula I

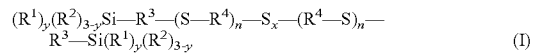

and a silane of the formula II

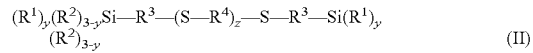

where the molar ratio of silane of the formula I to silane of the formula II is 19:81-81:19.

The silane mixture according to the invention can be prepared by mixing the silanes of the formula I and silanes of the formula II.

14 Claims, No Drawings

SILANE MIXTURES AND PROCESSES FOR PREPARATION THEREOF

The invention relates to silane mixtures and to processes for preparation thereof.

EP 0670347 and EP 0753549 disclose rubber mixtures comprising at least one crosslinker, a filler, optionally further rubber auxiliaries and at least one reinforcing additive of the formula

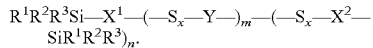

In addition, EP 1375504 discloses silanes of the formula

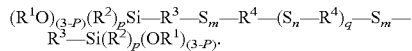

WO 2005/059022 discloses rubber mixtures comprising a silane of the formula

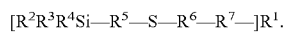

Additionally known are rubber mixtures comprising a bifunctional silane and a further silane of the formula (Y)G(Z) (WO 2012/092062) and rubber mixtures comprising bistriethoxysilylpropyl polysulfide and bistriethoxysilylpropyl monosulfide (EP1085045).

EP 1928949 discloses a rubber mixture comprising the silanes $(H_5C_2O)_3Si—(CH_2)_3—X—(CH_2)_6—S_2—(CH_2)_6—X—(CH_2)_3—Si(OC_2H_5)_3$ and/or $(H_5C_2O)_3Si—(CH_2)_3—X—(CH_2)_{10}—S_2—(CH_2)_{10}—X—(CH_2)_3—Si(OC_2H_5)_3$ and $(H_5C_2O)_3Si—(CH_2)_3—S_m—(CH_2)_3—Si(OC_2H_5)_3$.

In addition, silane mixtures comprising silanes of the formula $R^1R^2R^3Si—X^1—S_x—X^2—SiR^1R^2R^3$ and silanes of the formula $R^4R^5R^6Si—X^3—(—S_y—Y—)_m—S_y—X^4—SiR^7R^8R^9$ are known from EP 2557116.

It is an object of the present invention to provide silane mixtures having improved processing characteristics and improved viscosity, higher crosslinking yields, higher strengthening and improved rolling resistance in rubber mixtures compared to silanes known from the prior art.

The invention provides a silane mixture comprising a silane of the formula I

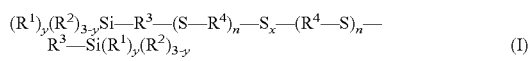

and a silane of the formula II

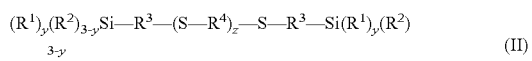

where $R^1$ are the same or different and are C1-C10-alkoxy groups, preferably methoxy or ethoxy groups, phenoxy groups, C4-C10-cycloalkoxy groups or alkyl polyether groups $—O—(R^5—O)_r—R^6$ where $R^5$ are the same or different and are a branched or unbranched, saturated or unsaturated, aliphatic, aromatic or mixed aliphatic/aromatic divalent C1-C30 hydrocarbon group, preferably $—CH_2—CH_2—$, r is an integer from 1 to 30, preferably 3 to 10, and $R^6$ is unsubstituted or substituted, branched or unbranched monovalent alkyl, alkenyl, aryl or aralkyl groups, preferably a $C_{13}H_{27}$-alkyl group. $R^2$ are the same or different and is C6-C20-aryl groups, preferably phenyl. C1-C10-alkyl groups, preferably methyl or ethyl, C2-C20-alkenyl group, C7-C20-aralkyl group or halogen, preferably Cl, $R^3$ are the same or different and are a branched or unbranched, saturated or unsaturated, aliphatic, aromatic or mixed aliphatic/aromatic divalent C1-C30 hydrocarbon group, preferably C1-C20, more preferably C1-C10, even more preferably C2-C7, especially preferably $CH_2CH_2$ and $CH_2CH_2CH_2$, $R^4$ are the same or different and are a branched or unbranched, saturated or unsaturated, aliphatic, aromatic or mixed aliphatic/aromatic divalent C1-C30 hydrocarbon group, preferably C1-C20, more preferably C1-C10, even more preferably C2-C7, especially preferably $(CH_2)_6$, and x is an integer from 2 to 10, preferably 2 to 4, more preferably 2, n are the same and are 0, 1, 2 or 3, preferably 0 or 1, more preferably 1, y are the same or different and are 1, 2 or 3, z is 1, 2 or 3, preferably 1, and the molar ratio of silane of the formula I to silane of the formula II is 19:81-81:19, preferably 20:80-75:25, more preferably 20:80-70:30, most preferably 20:80-65:35.

Preferably, the silane mixture may comprise a silane of the formula I

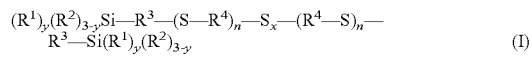

and a silane of the formula II

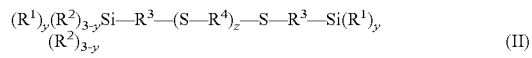

where n are the same and are 0 or 1, z is 1 and $R^1$, $R^2$, $R^3$, $R^4$, x and y have the same definition as described above.

The silane mixture according to the invention may comprise further additives or consist solely of silanes of the formula I and silanes of the formula II.

The silane mixture according to the invention may comprise oligomers that form as a result of hydrolysis and condensation of the silanes of the formula I and/or silanes of the formula II.

The silane mixture according to the invention may have been applied to a support, for example wax, polymer or carbon black. The silane mixture according to the invention may have been applied to a silica, in which case the binding may be physical or chemical.

$R^3$ and $R^4$ may independently be $—CH_2—$, $—CH_2CH_2—$, $—CH_2CH_2CH_2—$, $—CH_2CH_2CH_2CH_2—$, $—CH(CH_3)—$, $—CH_2CH(CH_3)—$, $—CH(CH_3)CH_2—$, $—C(CH_3)_2—$, $—CH(C_2H_5)—$, $—CH_2CH_2CH(CH_3)—$, $—CH(CH_3)CH_2CH_2—$, $—CH_2CH(CH_3)CH_2—$, $—CH_2CH_2CH_2CH_2CH_2—$, $—CH_2CH_2CH_2CH_2CH_2CH_2—$, $—CH_2CH_2CH_2CH_2CH_2CH_2CH_2—$, $—CH_2CH_2CH_2CH_2CH_2CH_2CH_2CH_2—$, $—CH_2CH_2CH_2CH_2CH_2CH_2CH_2CH_2CH_2—$, $—CH_2CH_2CH_2CH_2CH_2CH_2CH_2CH_2CH_2CH_2—$, $—CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2CH_2CH_2—$, $—CH_2CH_2CH_2CH_2CH_2CH_2CH_2CH_2CH_2CH_2CH_2CH_2CH_2CH_2CH_2—$ or

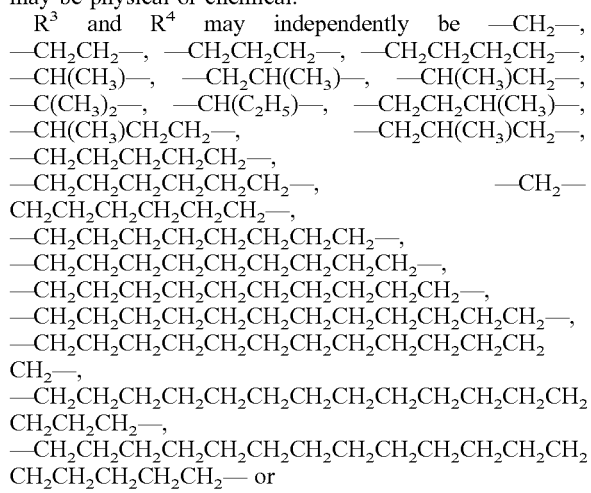

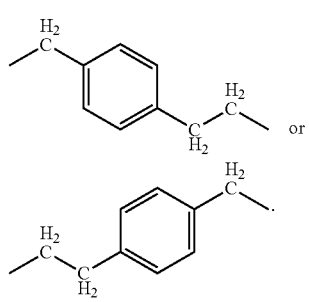

$R^1$ may preferably be methoxy or ethoxy.

Silanes of the formula I may preferably be:
(EtO)$_3$Si—CH$_2$—S$_2$—CH$_2$—Si(OEt)$_3$,
(EtO)$_3$Si—(CH$_2$)$_2$—S$_2$—(CH$_2$)$_2$—Si(OEt)$_3$,
(EtO)$_3$Si—(CH$_2$)$_3$—S$_2$—(CH$_2$)$_3$—Si(OEt)$_3$,
(EtO)$_3$Si—CH$_2$—S$_4$—CH$_2$—Si(OEt)$_3$,
(EtO)$_3$Si—(CH$_2$)$_2$—S$_4$—(CH$_2$)$_2$—Si(OEt)$_3$,
(EtO)$_3$Si—(CH$_2$)$_3$—S$_4$—(CH$_2$)$_3$—Si(OEt)$_3$,
(EtO)$_3$Si—(CH$_2$)$_2$—S—(CH$_2$)$_2$—S$_2$—(CH$_2$)$_2$—S—CH$_2$—Si(OEt)$_3$,
(EtO)$_3$Si—(CH$_2$)$_2$—S—(CH$_2$)$_2$—S$_2$—(CH$_2$)$_2$—S—(CH$_2$)$_2$—Si(OEt)$_3$,
(EtO)$_3$Si—(CH$_2$)$_2$—S—(CH$_2$)$_2$—S$_2$—(CH$_2$)$_2$—S—CH$_2$—Si(OEt)$_3$,
(EtO)$_3$Si—CH$_2$—S—(CH$_2$)$_3$—S$_2$—(CH$_2$)$_3$—S—CH$_2$—Si(OEt)$_3$,
(EtO)$_3$Si—(CH$_2$)$_2$—S—(CH$_2$)$_3$—S$_2$—(CH$_2$)$_3$—S—(CH$_2$)$_2$—Si(OEt)$_3$,
(EtO)$_3$Si—(CH$_2$)$_3$—S—(CH$_2$)$_3$—S$_2$—(CH$_2$)$_3$—S—(CH$_2$)$_3$—Si(OEt)$_3$,
(EtO)$_3$Si—CH$_2$—S—(CH$_2$)$_4$—S$_2$—(CH$_2$)$_4$—S—CH$_2$—Si(OEt)$_3$,
(EtO)$_3$Si—(CH$_2$)$_2$—S$_2$—(CH$_2$)$_4$—S—(CH$_2$)$_2$—Si(OEt)$_3$,
(EtO)$_3$Si—(CH$_2$)$_3$—S—(CH$_2$)$_4$—S$_2$—(CH$_2$)$_4$—S—(CH$_2$)$_3$—Si(OEt)$_3$,
(EtO)$_3$Si—CH$_2$—S—(CH$_2$)$_5$—S$_2$—(CH$_2$)$_5$—S—CH$_2$—Si(OEt)$_3$,
(EtO)$_3$Si—(CH$_2$)$_2$—S—(CH$_2$)$_5$—S$_2$—(CH$_2$)$_5$—S—(CH$_2$)$_2$—Si(OEt)$_3$,
(EtO)$_3$Si—(CH$_2$)$_3$—S—(CH$_2$)$_5$—S$_2$—(CH$_2$)$_5$—S—(CH$_2$)$_3$—Si(OEt)$_3$,
(EtO)$_3$Si—CH$_2$—S—(CH$_2$)$_6$—S$_2$—(CH$_2$)$_6$—S—CH$_2$—Si(OEt)$_3$,
(EtO)$_3$Si—(CH$_2$)$_3$—S—(CH$_2$)$_6$—S$_2$—(CH$_2$)$_6$—S—(CH$_2$)$_2$—Si(OEt)$_3$,
(EtO)$_3$Si—(CH$_2$)$_3$—S—(CH$_2$)$_6$—S$_2$—(CH$_2$)$_6$—S—(CH$_2$)$_3$—Si(OEt)$_3$.

Especially preferred is the silane of the formula
(EtO)$_3$Si—(CH$_2$)$_3$—S—(CH$_2$)$_6$—S$_2$—(CH$_2$)$_6$—S—(CH$_2$)$_3$—S(OEt)$_3$.

Silanes of the formula II may preferably be:
(EtO)$_3$Si—CH$_2$—S—CH$_2$—S—CH$_2$—S(OEt)$_3$,
(EtO)$_3$Si—(CH$_2$)$_2$—S—CH$_2$—S—(CH$_2$)$_2$—Si(OEt)$_3$,
(EtO)$_3$Si—(CH$_2$)—S—CH$_2$—S—(CH$_2$)$_3$—Si(OEt)$_3$,
(EtO)$_3$Si—CH$_2$—S—(CH$_2$)$_2$—S—CH$_2$—S(OEt)$_3$,
(EtO)$_3$Si—(CH$_2$)$_2$—S—(CH$_2$)$_2$—Si—(CH$_2$)$_2$—Si(OEt)$_3$,
(EtO)$_3$Si—(CH$_2$)$_3$—S—(CH$_2$)$_2$—S—(CH$_2$)$_3$—S(OEt)$_3$,
(EtO)$_3$Si—CH$_2$—S—(CH$_2$)$_3$—S—CH$_2$—Si(OEt)$_3$,
(EtO)$_3$Si—(CH$_2$)$_2$—S—(CH$_2$)$_3$—S—(CH$_2$)$_2$—Si(OEt)$_3$,
(EtO)$_3$Si—(CH$_2$)$_3$—S—(CH$_2$)$_3$—S—(CH$_2$)$_3$—S(OEt)$_3$,
(EtO)$_3$Si—CH$_2$—S—(CH$_2$)$_3$—S—CH$_2$—S(OEt)$_3$,
(EtO)$_3$Si—(CH$_2$)$_2$—S—(CH$_2$)$_4$—S—(CH$_2$)$_2$—Si(OEt)$_3$,
(EtO)$_3$Si—(CH$_2$)$_3$—S—(CH$_2$)$_4$—S—(CH$_2$)$_3$—Si(OEt)$_3$,
(EtO)$_3$Si—CH$_2$—S—(CH$_2$)$_5$—S—CH$_2$—Si(OEt)$_3$,
(EtO)$_3$Si—(CH$_2$)$_2$—S—(CH$_2$)$_5$—S—(CH$_2$)$_2$—Si(OEt)$_3$,
(EtO)$_3$Si—(CH$_2$)$_3$—S—(CH$_2$)$_5$—S—(CH$_2$)$_3$—Si(OEt)$_3$,
(EtO)$_3$Si—CH$_2$—S—(CH$_2$)$_6$—S—CH$_2$—Si(OEt)$_3$,
(EtO)$_3$Si—(CH$_2$)$_2$—S—(CH$_2$)$_6$—S—(CH$_2$)$_2$—Si(OEt)$_3$,
(EtO)$_3$Si—(CH$_2$)$_3$—S—(CH$_2$)$_6$—S—(CH$_2$)$_3$—Si(OEt)$_3$.

Especially preferred is the silane of the formula II
(EtO)$_3$Si—(CH$_2$)$_3$—S—(CH$_2$)$_6$—S—(CH$_2$)$_3$—Si(OEt)$_3$.

Very particular preference is given to a silane mixture of (EtO)$_3$Si—(CH$_2$)$_3$—(S—(CH$_2$)$_6$)$_n$—S$_2$—((CH$_2$)—S)$_n$—(CH$_2$)$_3$—S(OEt)$_3$ and (EtO)$_3$Si—(CH$_2$)$_3$—S—(CH$_2$)$_6$—S—(CH$_2$)$_3$—S(OEt)$_3$, where n are the same and are 0 or 1.

Exceptionally preferred is a silane mixture of (EtO$_3$)$_3$Si—(CH$_2$)$_3$—S—(CH$_2$)$_6$—S$_2$—(CH$_2$)$_6$—S—(CH$_2$)—Si(OEt)$_3$ and (EtO)$_3$Si—(CH$_2$)$_3$—S—(CH$_2$)$_6$—S—(CH$_2$)$_3$—Si(OEt)$_3$.

The invention further provides a first process for preparing the silane mixture according to the invention, which is characterized in that the silane of the formula I

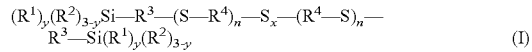
(I)

and a silane of the formula II

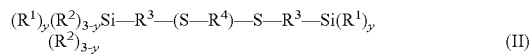
(II)

where R$^1$, R$^2$, R$^3$, R$^4$, n, x, y and z have the definition given above are mixed in a molar ratio of 19:81-81:19, preferably 20:80-75:25, more preferably 20:80-70:30, most preferably 20:80-65:35.

Preferably, a silane of the formula I

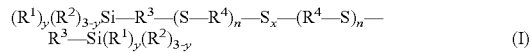
(I)

and a silane of the formula II

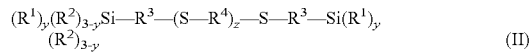
(II)

where R$^1$, R$^2$, R$^3$, R$^4$, x and y have the definition given above and n are the same and are 0 or 1 and z=1 can be mixed.

The process according to the invention can be conducted with exclusion of air. The process according to the invention can be conducted under protective gas atmosphere, for example under argon or nitrogen, preferably under nitrogen.

The process according to the invention can be conducted at standard pressure, elevated pressure or reduced pressure. Preferably, the process according to the invention can be conducted at standard pressure.

Elevated pressure may be a pressure of 1.1 bar to 100 bar, preferably of 1.1 bar to 50 bar, more preferably of 1.1 bar to 10 bar and very preferably of 1.1 to 5 bar.

Reduced pressure may be a pressure of 1 mbar to 1000 mbar, preferably 250 mbar to 1000 mbar, more preferably 500 mbar to 1000 mbar.

The process according to the invention can be conducted between 20° C. and 100° C., preferably between 20° C. and 50° C., more preferably between 20° C. and 30° C.

The process according to the invention can be conducted in a solvent, for example methanol, ethanol, propanol, butanol, cyclohexanol, N,N-dimethylformamide, dimethyl sulfoxide, pentane, hexane, cyclohexane, heptane, octane, decane, toluene, xylene, acetone, acetonitrile, carbon tetrachloride, chloroform, dichloromethane, 1,2-dichloroethane, tetrachloroethylene, diethyl ether, methyl tert-butyl ether, methyl ethyl ketone, tetrahydrofuran, dioxane, pyridine or methyl acetate, or a mixture of the aforementioned solvents. The process according to the invention can preferably be conducted without solvent.

The invention further provides a process for producing the silane mixture according to the invention with n=1 and z=1, which is characterized in that in a first step a mercaptosilane of the formula III

(II)

is reacted with a halogen compound of the formula IV

(IV)

where R$^1$, R$^2$, R$^3$ and R$^4$ have the definitions given above and Hal is F, Cl, Br or I, preferably Cl, in a molar ratio of the formula (III) to the formula (IV) of 34:66-64:36 and in a second step the product from the first process step is reacted with sodium polysulfide of the formula (V)

$$Na_2S_x \qquad (V)$$

where x has the definition given above.

The reaction in the first step can be effected with addition of a base. The base can be reacted with the mercaptosilane of the formula (III) and then with the halogen compound of the formula (IV).

Mercaptosilanes of the formula III may preferably be:
$(C_2H_5O)_3Si—CH_2—SH$,
$(C_2H_5O)_3Si—CH_2CH_2—SH$,
$(C_2H_5O)_3Si—CH_2CH_2CH_2—SH$.

Halogen compounds of the formula IV may preferably be:
Cl—CH$_2$—Cl,
Cl—CH$_2$CH$_2$—Cl,
Cl—CH$_2$CH$_2$CH$_2$—Cl,
Cl—CH$_2$CH$_2$CH$_2$CH$_2$—Cl
Cl—CH$_2$CH$_2$CH$_2$CH$_2$CH$_2$—Cl,
Cl—CH$_2$CH$_2$CH$_2$CH$_2$CH$_2$CH$_2$—Cl,
Cl—CH$_2$CH$_2$CH$_2$CH$_2$CH$_2$CH$_2$CH$_2$—Cl or
Cl—CH$_2$CH$_2$CH$_2$CH$_2$CH$_2$CH$_2$CH$_2$CH$_2$—Cl Especially preferably, the mercaptosilane of the formula III may be
(EtO)$_3$Si—(CH$_2$)$_3$—SH
the halogen compound of the formula IV may be
Cl—(CH$_2$)$_6$—Cl
and the sodium polysulfide of the formula V may be
Na$_2$S$_2$.

In the process for preparing the silane mixture according to the invention with n=1 and z=1, the first and second process steps can be effected in one reaction vessel by addition of all reactants.

In the first step of the process for preparing the silane mixture according to the invention with n=1 and z=1, the halogen compound of the formula IV can be metered into the mercaptosilane of the formula III.

In the first step of the process for preparing the silane mixture according to the invention with n=1 and z=1, the mercaptosilane of the formula III can preferably be metered into the halogen compound of the formula IV.

The reaction in the first step of the process for preparing the silane mixture according to the invention with n=1 and z=1 can be conducted with exclusion of air.

The reaction in the first step of the process for preparing the silane mixture according to the invention with n=1 and z=1 can be conducted under protective gas atmosphere, for example under argon or nitrogen, preferably under nitrogen.

The first step of the process for preparing the silane mixture according to the invention with n=1 and z=1 can be conducted at standard pressure, elevated pressure or reduced pressure.

Preferably, the process according to the invention can be conducted at standard pressure.

Elevated pressure may be a pressure of 1.1 bar to 100 bar, preferably of 1.1 bar to 50 bar, more preferably of 1.1 bar to 10 bar and very preferably of 1.1 to 5 bar.

Reduced pressure may be a pressure of 1 mbar to 1000 mbar, preferably 250 mbar to 1000 mbar, more preferably 500 mbar to 1000 mbar.

The first step of the process for preparing the silane mixture according to the invention with n=1 and z=1 can be conducted between 0° C. and 150° C., preferably between 30° C. and 100° C., more preferably between 60° C. and 80° C.

The reaction in the first step of the process for preparing the silane mixture according to the invention with n=1 and z=1 can be effected without solvent or in a solvent, for example methanol, ethanol, propanol, butanol, cyclohexanol, N,N-dimethylformamide, dimethyl sulfoxide, pentane, hexane, cyclohexane, heptane, octane, decane, toluene, xylene, acetone, acetonitrile, carbon tetrachloride, chloroform, dichloromethane, 1,2-dichloroethane, tetrachloroethylene, diethyl ether, methyl tert-butyl ether, methyl ethyl ketone, tetrahydrofuran, dioxane, pyridine, ethyl acetate or a mixture of the aforementioned solvents. The solvent may preferably be dichloromethane, ethanol, methyl tert-butyl ether, toluene, ethyl acetate, pentane, hexane or a mixture of the aforementioned solvents.

The reaction in the first step of the process for preparing the silane mixture according to the invention with n=1 and z=1 can be conducted without organic solvents. The solvent may be water.

The reaction product from the first step of the process for preparing the silane mixture according to the invention with n=1 and z=1 can subsequently be freed of solid by-products by filtration.

The solvent in the first step of the process for preparing the silane mixture according to the invention with n=1 and z=1 can subsequently be removed, preferably distilled off.

The reaction in the second step of the process for preparing the silane mixture according to the invention with n=1 and z=1 can be conducted with exclusion of air.

The reaction in the second step of the process for preparing the silane mixture according to the invention with n=1 and z=1 can be conducted under protective gas atmosphere, for example under argon or nitrogen, preferably under nitrogen.

The second step of the process for preparing the silane mixture according to the invention with n=1 and z=1 can be conducted at standard pressure, elevated pressure or reduced pressure.

Preferably, the process according to the invention can be conducted at standard pressure.

Elevated pressure may be a pressure of 1.1 bar to 100 bar, preferably of 1.1 bar to 50 bar, more preferably of 1.1 bar to 10 bar and very preferably of 1.1 to 5 bar.

Reduced pressure may be a pressure of 1 mbar to 1000 mbar, preferably 250 mbar to 1000 mbar, more preferably 500 mbar to 1000 mbar.

The second step of the process for preparing the silane mixture according to the invention with n=1 and z=1 can be conducted between 20° C. and 150° C., preferably between 40° C. and 100° C., more preferably between 60° C. and 90° C.

The reaction in the second step of the process for preparing the silane mixture according to the invention with n=1 and z=1 can be effected without solvent or in a solvent, for example methanol, ethanol, propanol, butanol, cyclohexanol, N,N-dimethylformamide, dimethyl sulfoxide, pentane, hexane, cyclohexane, heptane, octane, decane, toluene, xylene, acetone, acetonitrile, carbon tetrachloride, chloroform, dichloromethane, 1,2-dichloroethane, tetrachloroethylene, diethyl ether, methyl tert-butyl ether, methyl ethyl ketone, tetrahydrofuran, dioxane, pyridine or ethyl acetate. The solvent may preferably be ethanol.

The reaction in the second step of the process for preparing the silane mixture according to the invention with n=1 and z=1 can be conducted without organic solvents. The solvent may be water.

The reaction product in the second step of the process for preparing the silane mixture according to the invention with n=1 and z=1 can be filtered and the filtercake can be washed with an organic solvent. Preferably, an alcohol can be used for washing, more preferably ethanol, or an alkane, more preferably hexane.

The solvent in the second step of the process for preparing the silane mixture according to the invention with n=1 and z=1 can subsequently be removed, preferably distilled off.

The reaction product in the second step of the process for preparing the silane mixture according to the invention with n=1 and z=1, after the filtration and removal of solvent, can be dried. The drying can be effected at temperatures of 20° C.-100° C., preferably of 25° C.-50° C. The drying can be effected at a reduced pressure of 1-500 mbar.

The silane mixture according to the invention can be used as adhesion promoter between inorganic materials, for example glass beads, glass flakes, glass surfaces, glass fibres, or oxidic fillers, preferably silicas such as precipitated silicas and fumed silicas, and organic polymers, for example thermosets, thermoplastics or elastomers, or as crosslinking agents and surface modifiers for oxidic surfaces.

The silane mixture according to the invention can be used as coupling reagent in filled rubber mixtures, examples being tyre treads, industrial rubber articles or footwear soles.

Advantages of the silane mixtures according to the invention are improved processing characteristics, improved viscosity, higher crosslinking yields, higher strengthening and improved rolling resistance in rubber mixtures.

EXAMPLES

NMR method: The molar ratios and proportions by mass reported as analysis results in the examples come from $^{13}$C NMR measurements with the following indices: 100.6 MHz, 1000 scans, solvent: $CDCl_3$, internal standard for calibration: tetramethylsilane, relaxation aid: $Cr(acac)_3$; for the determination of the proportion by mass in the product, a defined amount of dimethyl sulfone was added as internal standard and the molar ratios of the products are used to calculate the proportion by mass.

Comparative Example 1: 6-bis(thiopropyltriethoxysilylhexyl) disulfide 6-Bis(thiopropyltriethoxysilylhexyl) disulfide was prepared according to Synthesis Example 1 and Example 1 of EP 1375504.

By contrast with Synthesis Example 1 of EP1375504, the intermediate was not distilled.

Analysis: (88% yield, molar ratio: silane of the formula I: 94% $(EtO)_3Si(CH_2)_3S(CH_2)_6S_2(CH_2)_6S(CH_2)_3Si(OEt)_3$ and silane of the formula II: 6% $(EtO)_3Si(CH_2)_3S(CH_2)_6S(CH_2)_3Si(OEt)_3$, % by weight: silane of the formula I: 95% by weight of $(EtO)_3Si(CH_2)_3S(CH_2)_6S_2(CH_2)_6S(CH_2)_3Si(OEt)_3$ and silane of the formula II: 5% by weight of $(EtO)_3Si(CH_2)_3S(CH_2)_6S(CH_2)_3Si(OEt)_3$)

Comparative Example 2:
1,6-bis(thiopropyltriethoxysilyl)hexane

Sodium ethoxide (21% in EtOH; 82.3 g; 0.254 mol; 2.05 eq) was metered into mercaptopropyltriethoxysilane (62.0 g; 0.260 mol; 2.10 eq) such that the reaction temperature did not exceed 35° C. On completion of addition, the mixture was heated at reflux for 2 h. Then the reaction mixture was added to 1,6-dichlorohexane (19.2 g; 0.124 mol; 1.00 eq) at 80° C. over 1.5 h. On completion of addition, the mixture was heated at reflux for 3 h and then left to cool to room temperature. Precipitated salts were filtered off and the product was freed of the solvent under reduced pressure. The product (yield: 88%, purity: >99% in $^{13}$C NMR) was obtained as a clear liquid.

Comparative Example 3: Bis(Triethoxysilylpropyl) Disulfide from Evonik Industries AG Comparative Example 4: bis(triethoxysilylpropyl) sulfide To a solution of chloropropyltriethoxysilane (361 g; 1.5 mol; 1.92 eq) in ethanol (360 ml) was added $Na_2S$ (61.5 g; 0.78 mol; 1.00 eq) in portions at such a rate as to not exceed 60° C. Completion of addition was followed by heating at reflux for 3 h, before leaving to cool to room temperature. The reaction product was freed of precipitated salts by filtration. By distillative purification (0.04 mbar; 110° C.), it was possible to obtain the product (yield: 73%, purity: >99% by $^{13}$C NMR) as a clear liquid.

Comparative Example 5

4.3 parts by weight of Comparative Example 3 together with 2.6 parts by weight of Comparative Example 4 were weighed into a flat PE bag from Kaiser und Kraft (film thickness: 50 µm) and mixed. This mixture corresponds to a molar ratio: silane of the formula I: 60% $(EtO)_3Si(CH_2)_3S_2(CH_2)_3Si(OEt)_3$ and silane of the formula II: 40% $(EtO)_3Si(CH_2)_3S(CH_2)_3Si(OEt)_3$.

Comparative Example 6

2.9 parts by weight of Comparative Example 3 together with 3.8 parts by weight of Comparative Example 4 were weighed into a flat PE bag from Kaiser und Kraft (film thickness: 50 µm) and mixed. This mixture corresponds to a molar ratio: silane of the formula I: 40% $(EtO)_3Si(CH_2)_3S_2(CH_2)_3Si(OEt)_3$ and silane of the formula II: 60% $(EtO)_3Si(CH_2)_3S(CH_2)_3Si(OEt)_3$.

Comparative Example 7

1.4 parts by weight of Comparative Example 3 together with 5.1 parts by weight of Comparative Example 4 were weighed into a flat PE bag from Kaiser und Kraft (film thickness: 50 µm) and mixed. This mixture corresponds to a molar ratio: silane of the formula I: 20% $(EtO)_3Si(CH_2)_3S_2(CH_2)_3Si(OEt)_3$ and silane of the formula II: 80% $(EtO)_3Si(CH_2)_3S(CH_2)_3Si(OEt)_3$.

Example 1

47.2 g of Comparative Example 1 together with 9.2 g of Comparative Example 2 were weighed into a flat PE bag from Kaiser und Kraft (film thickness: 50 µm) and mixed. This mixture corresponds to a molar ratio: silane of the formula I: 75% $(EtO)_3Si(CH_2)_3S(CH_2)_6S_2(CH_2)_6S(CH_2)_3Si(OEt)_3$ and silane of the formula I: 25% $(EtO)_3Si(CH_2)_3S(CH_2)_6S(CH_2)_3Si(OEt)_3$.

Example 2

46.8 g of Comparative Example 1 together with 24.3 g of Comparative Example 2 were weighed into a flat PE bag from Kaiser und Kraft (film thickness: 50 µm) and mixed. This mixture corresponds to a molar ratio: silane of the formula I: 57% $(EtO)_3Si(CH_2)_3S(CH_2)_6S_2(CH_2)_6S(CH_2)_3Si(OEt)_3$ and silane of the formula II: 43% $(EtO)_3Si(CH_2)_3S(CH_2)_6S(CH_2)_3Si(OEt)_3$.

Example 3

45.6 g of Comparative Example 1 together with 36.0 g of Comparative Example 2 were weighed into a flat PE bag from Kaiser und Kraft (film thickness: 50 μm) and mixed. This mixture corresponds to a molar ratio: silane of the formula I: 47% $(EtO)_3Si(CH_2)_3S(CH_2)_6S_2(CH_2)_6S(CH_2)_3Si(OEt)_3$ and silane of the formula II: 53% $(EtO)_3Si(CH_2)_3S(CH_2)_6S(CH_2)_3Si(OEt)_3$.

Example 4

NaOEt (21% in EtOH; 1562 g: 4.820 mol) was metered into mercaptopropyltriethoxysilane (1233 g; 5.170 mol) over the course of 1 h while stirring at room temperature. On completion of addition, the reaction mixture was heated at reflux for 2 h and then left to cool to room temperature. The intermediate formed was metered into 1,6-dichlorohexane (801.7 g; 5.170 mol) that had been heated to 80° C. over the course of 30 min. On completion of addition, the reaction mixture was heated at reflux for 3 h, before being left to cool to room temperature. The reaction mixture was filtered and the filtercake was rinsed with EtOH. The volatile constituents were removed under reduced pressure and the 1-chloro-6-thiopropyltriethoxysilylhexane intermediate (yield: 88%, molar ratio: 66% 1-chloro-6-thiopropyltriethoxysilylhexane, 34% bis(thiopropyltriethoxysilyl)hexane; % by weight: 56% by weight of I-chloro-6-thiopropyltriethoxysilylhexane, 44% by weight of 1,6-bis(thiopropyltriethoxysilyl)hexane) was obtained.

Example 5

A solution of NaSH (40% in water; 46.01 g; 0.3283 mol; 1.044 eq.) and $Na_2CO_3$ (38.44 g; 0.3627 mol; 1.153 eq.) in water (123.2 g; 6.837 mol; 21.74 eq.) was heated to 80° C. while stirring. Sulfur (9.940 g; 0.3101 mol; 0.9859 eq.) was added and the mixture was stirred for 45 min. Tetrabutylphosphonium bromide (50% in water; 2.560 g; 3.774 mmol; 0.012 eq.) and the 1-chloro-6-thiopropyltriethoxysilylhexane intermediate from Example 4 (224.6 g; 0.6290 mol; 2,000 eq.) was added over the course of 30 min and then stirred at 75-80° C. for 5 h. The organic phase was removed and freed of volatile constituents under reduced pressure, 6-Bis(thiopropyltriethoxysilylhexyl) disulfide (yield: 97%, molar ratio: silane of the formula I: 64% $(EtO)_3Si(CH_2)_3S(CH_2)_6S_2(CH_2)_6S(CH_2)_3Si(OEt)_3$ and silane of the formula II: 36% $(EtO)_3Si(CH_2)_3S(CH_2)_6S(CH_2)_3Si(OEt)_3$, % by weight: silane of the formula I: 69% by weight of $(EtO)_3Si(CH_2)_3S(CH_2)_6S_2(CH_2)_6S(CH_2)_3Si(OEt)_3$ and silane of the formula II: 31% by weight of $(EtO)_3Si(CH_2)_3S(CH_2)_6S(CH_2)_3Si(OEt)_3)$ was obtained as a clear liquid.

Example 6

$H_2S$ (27.179 g; 0.798 mol; 1.40 eq) was metered at 60° C. into NaOEt (about 21% in EtOH; prepared from sodium (27.50 g; 1.196 mol; 2.10 eq) and EtOH (425 g) over the course of 20 min. After the addition and reaction time of 30 minutes, sulfur (20.07 g; 0.627 mol; 1.10 eq) was added. After 20 min, 1-chloro-6-thiopropyltriethoxysilylhexane from Example 4 (61% purity: 600 g, 1.139 mol, 2.00 eq).

Subsequently, the reaction temperature was adjusted to 80° C. and the mixture was stirred until conversion was complete. On completion of reaction, solids formed were removed by filtration and the product was freed of the solvent under reduced pressure. Bis(thiopropyltriethoxysilylhexyl) disulfide (yield: 98%, molar ratio: silane of the formula I: 64% $(EtO)_3Si(CH_2)_3S(CH_2)_6S_2(CH_2)_6S(CH_2)_3Si(OEt)_3$ and silane of the formula II: 36% $(EtO)_3Si(CH_2)_3S(CH_2)_6S(CH_2)_3Si(OEt)_3$, % by weight: silane of the formula I: 69% by weight of $(EtO)_3Si(CH_2)_3S(CH_2)_6S_2(CH_2)_6S(CH_2)_3Si(OEt)_3$ and silane of the formula II: 31% by weight of $(EtO)_3Si(CH_2)_3S(CH_2)_6S(CH_2)_3Si(OEt)_3)$ was obtained as a clear liquid.

Example 7

1-Chloro-6-thiopropyltriethoxysilylhexane from Example 4 (61% purity; 600.0 g; 1.139 mol; 2.00 eq) was dissolved in EtOH (600 g). Thereafter, sodium polysulfide $(Na_2S_{3.79}; 20.02$ g; 0.120 mol; 0.21 eq) was added in solid form, and the reaction mixture was heated to 60° C. and kept at that temperature for 30-60 minutes. Then, at 60° C., the first of a total of eight metered additions of $Na_2S$ was effected (totaling 13.33 g; 0.171 mol; 0.3 eq). Thereafter, the mixture was heated at reflux for 1 h. The remaining seven metered additions of $Na_2S$ were effected under reflux and each at an interval of 10 minutes. After the last metered addition of $Na_2S$, the mixture was heated at reflux for another two hours and then left to cool to room temperature. The reaction mixture was filtered. The filtrate was freed of volatile constituents under reduced pressure and filtered again. The product (95%, molar ratio: silane of the formula I: 64% $(EtO)_3Si(CH_2)_3S(CH_2)_6S_2(CH_2)_6S(CH_2)_3Si(OEt)_3$ and silane of the formula II: 36% $(EtO)_3Si(CH_2)_3S(CH_2)_6S(CH_2)_3Si(OEt)_3$, % by weight: silane of the formula I: 69% by weight of $(EtO)_3Si(CH_2)_3S(CH_2)_6S_2(CH_2)_6S(CH_2)_3Si(OEt)_3$ and silane of the formula II: 31% by weight of $(EtO)_3Si(CH_2)_3S(CH_2)_6S(CH_2)_3Si(OEt)_3)$ was obtained as a clear liquid.

Example 8

7.2 parts by weight of Comparative Example 1 together with 3.4 parts by weight of Comparative Example 2 were weighed into a flat PE bag from Kaiser und Kraft (film thickness: 50 μm) and mixed. This mixture corresponds to a molar ratio: silane of the formula I: 59% $(EtO)_3Si(CH_2)_3S(CH_2)_6S_2(CH_2)_6S(CH_2)_3Si(OEt)_3$ and silane of the formula II: 41% $(EtO)_3Si(CH_2)_3S(CH_2)_6S(CH_2)_3Si(OEt)_3$.

Example 9

7.2 parts by weight of Comparative Example 1 together with 4.6 parts by weight of Comparative Example 2 were weighed into a flat PE bag from Kaiser und Kraft (film thickness: 50 μm) and mixed. This mixture corresponds to a molar ratio: silane of the formula I: 52% $(EtO)_3Si(CH_2)_3S(CH_2)_6S_2(CH_2)_6S(CH_2)_3Si(OEt)_3$ and silane of the formula II: 48% $(EtO)_3Si(CH_2)_3S(CH_2)_6S(CH_2)_3Si(OEt)_3$.

Example 10

7.5 parts by weight of Comparative Example 1 together with 4.0 parts by weight of Comparative Example 2 were weighed into a flat PE bag from Kaiser und Kraft (film thickness: 50 μm) and mixed. This mixture corresponds to a molar ratio: silane of the formula I: 56% $(EtO)_3Si(CH_2)_3S$ $(CH_2)_6S_2(CH_2)_6S(CH_2)_3Si(OEt)_3$ and silane of the formula II: 44% $(EtO)_3Si(CH_2)_3S(CH_2)_6S(CH_2)_3Si(OEt)_3$.

Example 11

5.5 parts by weight of Comparative Example 1 together with 6.5 parts by weight of Comparative Example 2 were weighed into a flat PE bag from Kaiser und Kraft (film thickness: 50 μm) and mixed. This mixture corresponds to a molar ratio: silane of the formula I: 38% $(EtO)_3Si(CH_2)_3S(CH_2)_6S_2(CH_2)_6S(CH_2)_3Si(OEt)_3$ and silane of the formula II: 62% $(EtO)_3Si(CH_2)_3S(CH_2)_6S(CH_2)_3Si(OEt)_3$.

Example 12

3.0 parts by weight of Comparative Example 1 together with 9.5 parts by weight of Comparative Example 2 were weighed into a flat PE bag from Kaiser und Kraft (film thickness: 50 μm) and mixed. This mixture corresponds to a molar ratio: silane of the formula I: 19% $(EtO)_3Si(CH_2)_3S(CH_2)_6S_2(CH_2)_6S(CH_2)_3Si(OEt)_3$ and silane of the formula II: 81% $(EtO)_3Si(CH_2)_3S(CH_2)_6S(CH_2)_3Si(OEt)_3$.

Example 13

4.3 parts by weight of Comparative Example 3 together with 3.4 parts by weight of Comparative Example 2 were weighed into a flat PE bag from Kaiser und Kraft (film thickness: 50 μm) and mixed. This mixture corresponds to a molar ratio: silane of the formula I: 60% $(EtO)_3Si(CH_2)_3S_2(CH_2)_3Si(OEt)_3$ and silane of the formula II: 40% $(EtO)_3Si(CH_2)_3S(CH_2)_6S(CH_2)_3Si(OEt)_3$.

Example 14

2.9 parts by weight of Comparative Example 3 together with 5.1 parts by weight of Comparative Example 2 were weighed into a flat PE bag from Kaiser und Kraft (film thickness: 50 μm) and mixed. This mixture corresponds to a molar ratio: silane of the formula I: 40% $(EtO)_3Si(CH)_3S_2(CH_2)_3Si(OEt)_3$ and silane of the formula II: 60% $(EtO)_3Si(CH_2)_3S(CH_2)_6S(CH_2)_3Si(OEt)_3$.

Example 15: Rubber Tests

The formulation used for the rubber mixtures is specified in Table 1 below. The unit phr means parts by weight based on 100 parts of the raw rubber used. Mixtures 1-4 all contain the same phr amount of silane of the formula I $(EtO)_3Si(CH_2)_3S(CH_2)_6S_2(CH_2)_6S(CH_2)_3Si(OEt)$ and an increasing amount of silane of the formula II $(EtO)_3Si(CH_2)_3S(CH_2)_6S(CH_2)_3Si(OEt)_3$.

TABLE 1

| | Mixture 1/ phr | Mixture 2/ phr Inv. | Mixture 3/ phr Inv. | Mixture 4/ phr Inv. | Mixture 5/ phr |
|---|---|---|---|---|---|
| | | | 1st stage | | |
| NR SMR 10[a] | 20.0 | 20.0 | 20.0 | 20.0 | 20.0 |
| High-cis BR[b] | 44.0 | 44.0 | 44.0 | 44.0 | 44.0 |
| S-SBR[c] | 36.0 | 36.0 | 36.0 | 36.0 | 36.0 |
| Silica[d] | 95.0 | 95.0 | 95.0 | 95.0 | 95.0 |
| TDAE oil[e] | 45.0 | 45.0 | 45.0 | 45.0 | 45.0 |

TABLE 1-continued

| | Mixture 1/ phr | Mixture 2/ phr Inv. | Mixture 3/ phr Inv. | Mixture 4/ phr Inv. | Mixture 5/ phr |
|---|---|---|---|---|---|
| 6PPD[f] | 2.0 | 2.0 | 2.0 | 2.0 | 2.0 |
| TMQ[g] | 2.0 | 2.0 | 2.0 | 2.0 | 2.0 |
| Antiozonant wax[h] | 2.0 | 2.0 | 2.0 | 2.0 | 2.0 |
| ZnO[i] | 2.5 | 2.5 | 2.5 | 2.5 | 2.5 |
| Fatty acid[j] | 2.5 | 2.5 | 2.5 | 2.5 | 2.5 |
| Comparative Example 1 | 9.94 | | | | |
| Example 1 | | 11.90 | | | |
| Example 2 | | | 1518 | | |
| Example 3 | | | | 17.79 | |
| Comparative Example 2 | | | | | 7.85 |
| | | | 2nd stage | | |
| Stage 1 batch | | | | | |
| | | | 3rd stage | | |
| Stage 2 batch | | | | | |
| DPG-80[k] | 2.5 | 2.5 | 2.5 | 2.5 | 2.5 |
| CBS[l] | 1.6 | 1.6 | 1.6 | 1.6 | 1.6 |
| Sulfur[m] | 2.0 | 2.0 | 2.0 | 2.0 | 2.0 |

Substances used in Table 1:

[a]NR TSR SMR 10: natural rubber from Wurfbain Nordmann GmbH (TSR = Technically Specified Rubber; SMR = Standard Malaysian Rubber)

[b]High-cis BR: Buna CB 24, solution polymerized high cis-1,4-polybutadiene (neodymium catalyst) from Arlanxeo GmbH (cis-1,4 content = min. 96%, Mooney viscosity (ML 1 + 4/100° C.) 44 MU).

[c]S-SBR: SPRINTAN SLR 4601-Schkopau; anionically polymerized solution styrene-butadiene rubber (organolithium initiator) from Trinseo (microstructure: medium styrene/ high vinyl; TG −25° C.)

[d]Silica: ULTRASIL ® VN 3 GR from Evonik industries AG (precipitated silica, BET surface area = 175 m²/g).

[e]TDAE oil: Vivatec 500 from H&R AG.

[f]6PPD: Vulkanox 4020/LG: N-(1,3-dimethylbutyl)-N'-phenyl-p-phenylenediamine (6PPD) from Rhein Chemie Rheinau GmbH.

[g]TMQ Vulkanox HS/LG: polymeric 2.2.4-trimethyl-1,2-dihydroquinoline (TMQ) from Rhein Chemie Rheinau GmbH.

[h]Antiozonant wax: Protektor G3108 composed of refined hydrocarbons (freezing point = 57° C.) from Paramelt B.V.

[i]ZnO: RS RAL 844 C ZnO zinc oxide from Amsperger Chemikalien GmbH.

[j]Fatty acid: fatty acid mixture ($C_{16}/C_{18}$), EDENOR ST1, from Caldic Deutschland Chemie B.V.

[k]DPG-80: Rhenogran DPG-80: 80% N,N'-diphenylguanidine (DPG) on 20% elastomeric carrier and dispersant from Rhein Chemie Rheinau GmbH.

[l]CBS: Vulkacit CZ/EG-C: N-cyclohexyl-2-benzothiazolesulfenamide from Rhein Chemie Rheinau GmbH.

[m]Sulfur: 80/90° ground sulfur from Solvay & CPC Barium Strontium GmbH & Co. KG.

The mixtures were prepared in three stages in a 1.5 l internal mixer (E-type) at a batch temperature of 150° C. in accordance with the mixing instructions described in Table 2.

The general process for preparing rubber mixtures and vulcanizates thereof is described in the book: "Rubber Technology Handbook", W. Hofmann, Hanser Verlag 1994.

TABLE 2

| Stage 1 | |
|---|---|
| Settings | |
| Mixing unit | HF Mixing Group GmbH; type GK 1.5 E |
| Fill level | 0.66 |
| Speed | 80 min$^{-1}$ |
| Ram pressure | 5.5 bar |
| Flow temp. | 80° C. |
| Mixing procedure | |
| 0 to 0.5 min | Rubbers |
| 0.5 to 1.5 min | All the silica minus 50 g, silane or silane mixture in the bag, ZnO, fatty acid, 6PPD, TMQ, antiozonant wax |
| 1.5 to 2.5 min | Reduce speed to 35 rpm, mix TDAE oil with remaining 50 g of silica and introduce mix into the kneader |
| 2.5 min | Vent |
| 2.5 to 7.0 min | Mix at 150° C., adjusting temperature by varying rotational speed |
| 7.0 min | Discharge batch and form a milled sheet on laboratory mixing roll mill for 45 s (laboratory roll mill: diameter 250 mm, length 190 mm, roll nip 4 mm, flow temperature 60° C.) Storage at room temperature for 24 h |

| Stage 2 | |
|---|---|
| Settings | |
| Mixing unit | as in stage 1 except |
| Fill level | 0.63 |
| Speed | 95 min$^{-1}$ |
| Flow temp. | 90° C. |
| Mixing procedure | |
| 0 to 2.0 min | Break up stage 1 batch |
| 2.0 to 3.0 min | Mix at 150° C., optionally adjusting temperature by varying rotational speed |
| 3.0 min | Discharge batch and form a milled sheet on laboratory mixing roll mill for 45 s (laboratory roll mill: diameter 250 mm, length 190 mm, roll nip 4 mm, flow temperature 60° C.) Storage at room temperature for 24 h |

| Stage 3 | |
|---|---|
| Settings | |
| Mixing unit | as in stage 1 except |
| Fill level | 0.60 |
| Speed | 55 min$^{-1}$ |
| Flow temp. | 50° C. |
| Mixing procedure | |
| 0 to 0.5 min | Break up stage 3 batch |
| 0.5 to 2.0 min | Accelerator and sulfur, mix at 95° C., optionally adjusting temperature by varying rotational speed |
| 2.0 min | Discharge batch and form a milled sheet on laboratory mixing roll mill for 20 s, make incisions three times on the left, three times on the right, fold over 3 times (laboratory roll mill: diameter 250 mm, length 190 mm, roll nip 4 mm, flow temperature 80° C.) |

Vulcanization was effected at a temperature of 160° C. in a typical vulcanizing press with a holding pressure of 120 bar after $t_{95\%}$. The $t_{95\%}$ time was determined by means of a moving die rheometer (rotorless vulcameter) as per ISO 6502 (section 3.2 "rotorless curemeter") at 160° C.

Rubber testing was effected in accordance with the test methods specified in Table 3.

TABLE 3

| Physical testing | Standard/conditions |
| --- | --- |
| Mooney viscosity ML 1 + 4 at 100° C. | ISO 289-1 |
| Mooney viscosity/MU | |
| Rubber process analyzer (RPA) at 165° C., 1.67 Hz, 3° = 42% | ISO 6502, section 3.2 "rotorless curemeter" |
| Mmin/dNm | |
| Mmax/dNm | |
| Δ torque ($M_{max}$-$M_{min}$)/dNm | |
| Rod tensile test at 23° C. | ISO 37 |
| Tensile strength/MPa | |
| 300% modulus/MPa | |

TABLE 3-continued

| Physical testing | Standard/conditions |
| --- | --- |
| Abrasion resistance, determined with an instrument with ISO 4649 a rotating cylinder drum, 10 N | |
| Loss of volume/mm³ | |
| Ball rebound 70° C. | ISO 8307 |
| Resilience/% | fall height 500 mm, steel ball d = 19 mm, 28 g |
| Viscoelastic properties of the vulcanizate at 60° C. | RPA 2000 Rubber Process Analyzer (Alpha Technologies), strain sweep, 1.7 Hz, 0.28%-42% elongation; see "RPA 2000 Operator's Manual" from Alpha Technologies, February 1997 |
| Maximum loss factor tan δ | |
| Viscoelastic properties at 0° C. and 60° C. | ISO 4664-1 16 Hz, initial force 50 N and amplitude force 25 N, heat treatment time 5 min, parameters recorded after 30 s testing time |
| Complex modulus E* | |
| Loss factor tan δ | |

Table 4 reports the rubber data for the crude mixtures and vulcanizates.

TABLE 4

| | Mixture 1 | Mixture 2 Inv. | Mixture 3 Inv. | Mixture 4 Inv. | Mixture 5 |
| --- | --- | --- | --- | --- | --- |
| Crude mixture results: | | | | | |
| Mooney viscosity ML 1 + 4 at 100° C. | | | | | |
| Mooney viscosity/MU | | | | | |
| 1st stage | 47 | 43 | 35 | 31 | 54 |
| 2nd stage | 41 | 37 | 31 | 27 | 46 |
| 3rd stage | 32 | 29 | 26 | 22 | 34 |
| Rubber process analyzer (RPA) 160° C., 1.67 Hz, 3° = 42% | | | | | |
| $M_{min}$/dNm | 3.8 | 3.6 | 3.1 | 2.7 | 3.9 |
| $M_{max}$/dNm | 35.9 | 41.9 | 44.5 | 46.9 | 34.0 |
| Δ torque ($M_{max}$-$M_{min}$)/dNm | 32.1 | 38.3 | 41.4 | 44.2 | 30.1 |
| Vulcanize results: | | | | | |
| Rod tensile test at 23° C. | | | | | |
| Tensile strength/MPa | 12.9 | 14.4 | 14.6 | 14.1 | 14.5 |
| 300% modulus/MPa | 5.0 | 5.5 | 6.4 | 6.7 | 3.1 |
| Abrasion resistance | | | | | |
| Loss of volume/mm³ | 100 | 97 | 72 | 78 | 213 |
| Ball rebound at 70° C. | | | | | |
| Resilience/% | 60.6 | 61.8 | 63.1 | 65.7 | 57.5 |
| Viscoelastic properties, 60° C., Rubber Process Analyzer (RPA), strain sweep, 1.7 Hz, 0.28%-42% elongation | | | | | |
| Maximum loss factor δ/— | 0.205 | 0.195 | 0.179 | 0.167 | 0.250 |
| Viscoelastic properties at 60° C., 16 Hz, initial force 50 N, ampl. force 25 N | | | | | |
| E* 0° C. | 9.0 | 10.7 | 14.8 | 17.7 | 9.0 |
| E* 60° C. | 6.1 | 6.7 | 7.3 | 8.4 | 5.7 |
| tan δ | 0.142 | 0.134 | 0.119 | 0.116 | 0.169 |

Compared to the comparative mixtures, the inventive mixtures feature improved processing (Mooney viscosity) in all three mixing stages. This is confirmed by lower $M_{min}$ values. In the inventive mixtures, higher crosslinking yields (Δ torque ($M_{max}$-$M_{min}$)) are obtained. Moreover, the silane mixtures according to the invention lead to advantages in strengthening (300% modulus), in abrasion resistance, in rolling resistance (resilience, tan δ) and in dynamic stiffness (E* at 000 and 60° C.).

Example 16: Rubber Tests

The formulation used for the rubber mixtures is specified in Table 5 below. The unit phr means parts by weight based on 100 parts of the raw rubber used. Mixtures 6-8 all contain the same phr amount of silane of the formula I (EtO)$_3$Si(CH$_2$)$_3$S(CH$_2$)$_6$S$_2$(CH$_2$)$_6$S(CH$_2$)$_3$Si(OEt)$_3$ and an increasing amount of silane of the formula II (EtO)$_3$Si(CH$_2$)$_3$S(CH$_2$)$_6$S(CH$_2$)$_3$Si(OEt)$_3$.

TABLE 5

| | Mixture 6/ phr | Mixture 7/ phr Inv. | Mixture 8/ phr Inv. |
|---|---|---|---|
| 1st stage | | | |
| NR[a] | 10.0 | 10.0 | 10.0 |
| BR[b] | 18.0 | 18.0 | 18.0 |
| S-SBR[c] | 72.0 | 72.0 | 72.0 |
| Silica[d] | 95.0 | 95.0 | 95.0 |
| TDAE oil[e] | 35.0 | 35.0 | 35.0 |
| 6PPD[f] | 2.0 | 2.0 | 2.0 |
| Antiozonant wax | 2.0 | 2.0 | 2.0 |
| Zinc oxide | 2.5 | 2.5 | 2.5 |
| Stearic acid | 2.5 | 2.5 | 2.5 |
| Comparative Example 1 | 6.8 | | |
| Example 8 | | 10.1 | |
| Example 9 | | | 11.2 |
| 2nd stage | | | |
| Stage 1 batch | | | |
| 3rd stage | | | |
| Stage 2 batch | | | |
| DPG[g] | 2.0 | 2.0 | 2.0 |
| CBS[h] | 2.0 | 2.0 | 2.0 |
| Sulfur[i] | 2.0 | 2.0 | 2.0 |

Substances used in Table 5:
[a]NR TSR: natural rubber (TSR = technically specified rubber).
[b]Europrene Neocis BR 40, from Polimeri.
[c]S-SBR: Sprintan ® SLR-4601, from Trinseo.
[d]Silica: ULTRASIL ® VN 3 GR from Evonik Industries AG (precipitated silica, BET surface area = 175 m$^2$/g).
[e]TDAE oil: treated distillate aromatic extract
[f]6PPD: N-(1.3-dimethylbutyl)-N'-phenyl-p-phenylenediamine (6PPD).
[g]DPG: N,N'-diphenylguanidine (DPG).
[h]CBS: N-cyclohexyl-2-benzothiazolesulfenamide.
[i]Sulfur: ground sulfur.

The mixture was produced in processes customary in the rubber industry in three stages in a laboratory mixer of capacity 300 milliliters to 3 litres, by first mixing, in the first mixing stage (base mixing stage), all the constituents apart from the vulcanization system (sulfur and vulcanization-influencing substances) at 145 to 165° C., target temperatures of 152 to 157° C., for 200 to 600 seconds. In the second stage, the mixture from stage 1 is thoroughly mixed once more, performing what is called a remill. Addition of the vulcanization system in the third stage (ready-mix stage) produced the finished mixture, with mixing at 90 to 120° C. for 180 to 300 seconds. All the mixtures were used to produce test specimens by vulcanization under pressure at 160° C. after t95 (measured on a moving die rheometer to ASTM D 5289-12/ISO 6502).

The general process for producing rubber mixtures and vulcanizates thereof is described in "Rubber Technology Handbook", W. Hofmann, Hanser Verlag 1994.

Rubber testing was effected in accordance with the test method specified in Table 6. The results of the rubber testing are reported in Table 7.

TABLE 6

| Physical testing | Standard/ conditions |
|---|---|
| Moving die rheometer (rotorless vulcameter) at 160° C.: Crosslinking rate between 30% and 90% conversion k30/90/min$^{-1}$ | ASTM D5289 and ISO 6502 |

TABLE 7

| | Mixture 6 | Mixture 7 Inv. | Mixture 8 Inv. |
|---|---|---|---|
| Crude mixture results: Moving die rheometer (MDR) at 160° C. | | | |
| k30/90/min$^{-1}$ | 0.18 | 0.35 | 0.34 |

The inventive examples are characterized by improved processing characteristics compared to the comparative example, which is manifested in a higher crosslinking rate between 30% and 90% conversion k30/90. In this way, the inventive examples achieve an improved resolution of the trade-off between processing reliability and full vulcanization.

Example 17: Rubber Tests

The formulation used for the rubber mixtures is specified in Table 8 below. The unit phr means parts by weight based on 100 parts of the raw rubber used. The mixtures each contain mixtures of the silanes of the formula I and mixtures of the silane of the formula II in the molar ratios 60:40; 40:60; 20:80.

TABLE 8

| | Mixture 9/phr Inv. | Mixture 10/phr Inv. | Mixture 11/phr Inv. | Mixture 12/phr | Mixture 13/phr | Mixture 14/phr | Mixture 15/phr Inv. | Mixture 16/phr Inv. |
|---|---|---|---|---|---|---|---|---|
| 1st stage | | | | | | | | |
| NR[a] | 10.0 | 10.0 | 10.0 | 10.0 | 10.0 | 10.0 | 10.0 | 10.0 |
| BR[b] | 18.0 | 18.0 | 18.0 | 18.0 | 18.0 | 18.0 | 18.0 | 18.0 |
| S-SBR[c] | 72.0 | 72.0 | 72.0 | 72.0 | 72.0 | 72.0 | 72.0 | 72.0 |
| Silica[d] | 95.0 | 95.0 | 95.0 | 95.0 | 95.0 | 95.0 | 95.0 | 95.0 |
| TDAE oil[e] | 50.0 | 50.0 | 50.0 | 50.0 | 50.0 | 50.0 | 50.0 | 50.0 |

TABLE 8-continued

|  | Mixture 9/phr Inv. | Mixture 10/phr Inv. | Mixture 11/phr Inv. | Mixture 12/phr | Mixture 13/phr | Mixture 14/phr | Mixture 15/phr Inv. | Mixture 16/phr Inv. |
|---|---|---|---|---|---|---|---|---|
| 6PPD[f] | 2.0 | 2.0 | 2.0 | 2.0 | 2.0 | 2.0 | 2.0 | 2.0 |
| Antiozonant wax | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 |
| Stearic acid | 2.5 | 2.5 | 2.5 | 2.5 | 2.5 | 2.5 | 2.5 | 2.5 |
| Example 10 | 10.9 | | | | | | | |
| Example 11 | | 11.4 | | | | | | |
| Example 12 | | | 11.9 | | | | | |
| Comparative Example 5 | | | | 6.6 | | | | |
| Comparative Example 6 | | | | | 6.4 | | | |
| Comparative Example 7 | | | | | | 6.2 | | |
| Example 13 | | | | | | | 7.3 | |
| Example 14 | | | | | | | | 7.6 |
| 2nd stage | | | | | | | | |
| Stage 1 batch | | | | | | | | |
| 3rd stage | | | | | | | | |
| Stage 2 batch | | | | | | | | |
| DPG[g] | 2.0 | 2.0 | 2.0 | 2.0 | 2.0 | 2.0 | 2.0 | 2.0 |
| CBS[h] | 2.0 | 2.0 | 2.0 | 2.0 | 2.0 | 2.0 | 2.0 | 2.0 |
| Sulfur[j] | 2.0 | 2.0 | 2.0 | 2.0 | 2.0 | 2.0 | 2.0 | 2.0 |

Substances used in Table 8:
[a]NR TSR: natural rubber (TSR = technically specified rubber).
[b]Europrene Neocis BR 40, from Polimeri.
[c]S-SBR: Sprintan ® SLR-4601, from Trinseo.
[d]Silica: ULTRASIL ® VN 3 GR from Evonik Industries AG (precipitated silica, BET surface area = 175 m$^2$/g).
[e]TDAE oil: Vivatec 500 from H&R AG.
[f]6PPD: N-(1,3-dimethylbutyl)-N'-phenyl-p-phenylenediamine (6PPD).
[g]DPG: N,N'-diphenylguanidine (DPG).
[h]CBS: N-cyclohexyl-2-benzothiazolesulfenamide.
j) Sulfur: ground sulfur.

The mixture was produced in processes customary in the rubber industry in three stages in a laboratory mixer of capacity 300 milliliters to 3 litres, by first mixing, in the first mixing stage (base mixing stage), all the constituents apart from the vulcanization system (sulfur and vulcanization-influencing substances) at 145 to 165° C., target temperatures of 152 to 157° C., for 200 to 600 seconds. In the second stage, the mixture from stage 1 was thoroughly mixed once more, 1.5 performing what is called a remill. Addition of the vulcanization system in the third stage (ready-mix stage) produced the finished mixture, with mixing at 90 to 120° C. for 180 to 300 seconds. All the mixtures were used to produce test specimens by vulcanization under pressure at 160° C. after t95 (measured on a moving die rheometer to ASTM D 5289-12/ISO 6502).

The general process for producing rubber mixtures and vulcanizates thereof is described in "Rubber Technology Handbook", W. Hofmann, Hanser Verlag 1994.

Rubber testing was effected in accordance with the test method specified in Table 6. The results of the rubber testing are reported in Table 9.

The inventive examples are characterized by improved processing characteristics compared to the comparative example, which is manifested in a higher crosslinking rate between 30% and 90% conversion k30/90. In this way, the inventive examples achieve an improved resolution of the trade-off between processing reliability and full vulcanization.

The invention claimed is:

1. A silane mixture comprising a silane of formula I

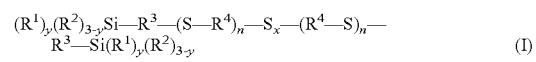

$$(R^1)_y(R^2)_{3-y}Si-R^3-(S-R^4)_n-S_x-(R^4-S)_n-R^3-Si(R^1)_y(R^2)_{3-y} \quad (I)$$

and a silane of formula II

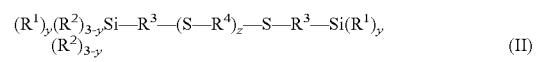

$$(R^1)_y(R^2)_{3-y}Si-R^3-(S-R^4)_z-S-R^3-Si(R^1)_y(R^2)_{3-y} \quad (II)$$

wherein $R^1$ are each independently C1-C10-alkoxy groups, phenoxy groups, C4-C10-cycloalkoxy groups or alkyl polyether groups —O—$(R^5$—O$)_r$—$R^6$ where $R^5$ are each independently a branched or unbranched, saturated or unsaturated, aliphatic, aromatic or mixed aliphatic/aromatic

TABLE 9

|  | Mixture 9/phr Inv. | Mixture 10/phr Inv. | Mixture 11/phr Inv. | Mixture 12/phr | Mixture 13/phr | Mixture 14/phr | Mixture 15/phr Inv. | Mixture 16/phr Inv. |
|---|---|---|---|---|---|---|---|---|
| Crude mixture results: | | | | | | | | |
| Moving die rheometer (MDR) at 160° C. k30/90/min$^{-1}$ | 0.35 | 0.36 | 0.38 | 0.20 | 0.20 | 0.21 | 0.25 | 0.30 | divalent C1-C30 hydrocarbon group, r is an integer from 1 to 30, and $R^6$ is an unsubstituted or substituted, branched or unbranched monovalent alkyl, alkenyl, aryl or aralkyl group, $R^2$ are each independently C6-C20-aryl groups, C1-C10 alkyl groups, C2-C20 alkenyl groups, C7-C20-aralkyl groups or halogen, $R^3$ are each independently branched or unbranched, saturated or unsaturated, aliphatic, aromatic or mixed aliphatic/aromatic divalent C1-C30 hydrocarbon groups, $R^4$ are each independently branched or unbranched, saturated or unsaturated, aliphatic, aromatic or mixed aliphatic/aromatic divalent C1-C30 hydrocarbon groups, and x is a number from 2 to 10, n are the same and are 0, 1, 2 or 3, y are each independently 1, 2 or 3, z is 1, 2 or 3, and the molar ratio of silane of the formula I to silane of the formula II is 19:81-81:19.

2. The silane mixture according to claim 1, wherein n is 0 or 1 and z=1.

3. The silane mixture according to claim 1, wherein n=1 and z=1.

4. The silane mixture according to claim 1, wherein x=2.

5. The silane mixture according to claim 3, wherein the silane of formula I is $(EtO)_3Si-(CH_2)_3-S-(CH_2)_6-S_2-(CH_2)_6-S-(CH_2)_3-Si(OEt)$ and the silane of formula is $(EtO)_3Si-(CH_2)_3-S-(CH_2)-S-(CH_2)_3-Si(OEt)_3$.

6. The silane mixture according to claim 2, wherein the silane of formula I is

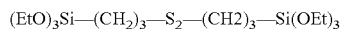

and the silane of formula II is

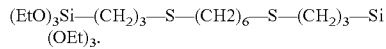

7. The silane mixture according to claim 1, wherein the silane of the molar ratio of silane of formula I to the silane of formula II is 20:80-65:35.

8. A process for preparing the silane mixture according to claim 1, comprising:

mixing the silane of formula I

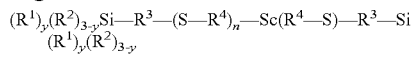 (I)

with the silane of formula II

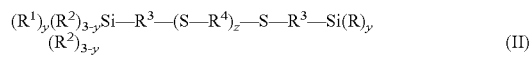 (II)

in a molar ratio of 81:19-19:81.

9. The process for preparing the silane mixture according to claim 8, wherein n is 0 or 1 and z=1.

10. The process for preparing the silane mixture according to claim 8, wherein n=1 and z=1.

11. The process for preparing the silane mixture according to claim 8, wherein the molar ratio of the silane of formula I to the silane of formula II is 50:50-70:30.

12. The process for preparing the silane mixture according to claim 9, that wherein the silane of formula I is

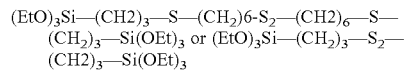

and the silane of formula II is

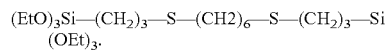

13. The process for preparing the silane mixture according to claim 3, reacting a mercaptosilane of formula III

 (III)

with a halogen compound of formula IV

 (IV)

Hal is F, CL Br or I in a molar ratio of the mercaptosilane of formula (III) to the halogen compound of formula (IV) of from 34:86-64:36 to obtain a product;

and reacting the product with sodium polysulfide of the formula (V)

 (V)

where x is as defined above.

14. The process for preparing the silane mixture according to claim 13, wherein the mercaptosilane of formula III is

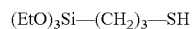

the halogen compound of formula IV is $C-(CH_2)_6-Cl$ and the sodium polysulfide of formula V is $Na_2S_2$.

* * * * *